United States Patent [19]

Yang

[11] Patent Number: 5,581,896
[45] Date of Patent: Dec. 10, 1996

[54] RECIPROCATING ACTION TOOL HAVING A STROKE ADJUSTING MECHANISM

[76] Inventor: Ah-Mi Yang, P.O. Box 63-99, Taichung, Taiwan

[21] Appl. No.: 613,864

[22] Filed: Mar. 11, 1996

[51] Int. Cl.⁶ ............................................. F16H 35/00
[52] U.S. Cl. ............................ 30/392; 74/50; 74/837
[58] Field of Search .................... 30/392, 393, 394; 74/50, 837

[56] References Cited

U.S. PATENT DOCUMENTS 4,031,763  6/1977  Eisenberg ....................... 74/50
4,261,228  4/1981  Eagan, Sr. ....................... 74/837
5,134,777  8/1992  Meyer et al. .................... 30/392

Primary Examiner—Hwei-Siu Payer

[57] ABSTRACT

A reciprocating acting tool includes a disc rotatably received in a housing and includes a shaft slidably engaged in the upper portion of the housing. The disc includes a bolt rotatably engaged in a groove and a slide threadedly engaged with the bolt. The slide includes a stud for rotatably supporting a follower which is slidably engaged with the shaft. The slide is moved longitudinally along the groove so as to adjust a moving stroke and a moving speed of the shaft. The shaft is moved quickly for driving a cutting tool and is moved slowly for moving a saw blade or a file.

5 Claims, 4 Drawing Sheets

RECIPROCATING ACTION TOOL HAVING A STROKE ADJUSTING MECHANISM

BACKGROUND OF THE INVENTION

1. Field of the Invention

The present invention relates to a tool, and more particularly to a reciprocating action tool having a stroke adjusting mechanism.

2. Description of the Prior Art

A typical reciprocating action tool is disclosed in U.S. Pat. No. 4,748,744 to Turner, filed on Jun. 17, 1986. The tool includes a shaft that is driven to move in a reciprocating action by an eccentric pin. However, the moving stroke of the shaft may not be adjusted such that the tool is good for acting as a nibbling tool only and may not be used for acting as other tools such as a saw and a file.

The present invention has arisen to mitigate and/or obviate the afore-described disadvantages of the conventional reciprocating acting tools.

SUMMARY OF THE INVENTION

The primary objective of the present invention is to provide a reciprocating acting tool having a stroke adjusting mechanism for adjusting the moving stroke of the shaft so as to allow the shaft to drive different tools.

In accordance with one aspect of the invention, there is provided a reciprocating acting tool comprising a housing including a chamber formed therein and including an upper portion having a channel laterally formed therein and communicating with the chamber, the channel including a front end and a rear end, a shaft slidably engaged in the channel and including a notch formed therein and including a front end, a disc rotatably engaged in the chamber and including a groove formed therein and including an upper portion having a slot formed therein and communicating with the groove, a bolt rotatably received in the groove, a slide slidably engaged in the groove and threadedly engaged with the bolt so as to allow the slide to be moved longitudinally along the groove when the bolt is rotated, the slide including a stud extended upward therefrom, and a follower rotatably engaged with the stud and slidably engaged in the notch of the shaft. The slide is moved longitudinally along the groove so as to adjust a moving stroke and a moving speed of the shaft.

The housing includes a passageway laterally formed therein and communicating with the chamber, the bolt includes a projection extended therefrom and rotatably engaging in the disc, the projection has a free end having a head formed thereon for stably and rotatably supporting the bolt in the groove, the bolt includes a free end distal to the projection and having an engaging hole formed therein for aligning with the passageway of the housing and for engaging with a wrench so as to be rotated.

A barrel includes a first end secured to the front end of the housing and includes a second end having a slit formed therein for engaging with a plate to be cut, a pole includes a first end secured to the front end of the shaft so as to be moved in concert with the shaft and includes a second end having an annular recess formed therein for engaging with the plate to be cut.

Another barrel includes a first end secured to the front end of the housing, a block is secured to the shaft so as to be moved in a reciprocating action by the shaft, a support is secured to the barrel, a sleeve is secured on the block and includes a post slidably engaged in the support so as to guide the block and the sleeve to move relative to the barrel and so as to prevent the block from rotating relative to the barrel, and a saw blade is secured to the block so as to be moved in a reciprocating action by the block and the shaft.

Alternatively, a file is secured to the block so as to be moved in a reciprocating action by the block and the shaft.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
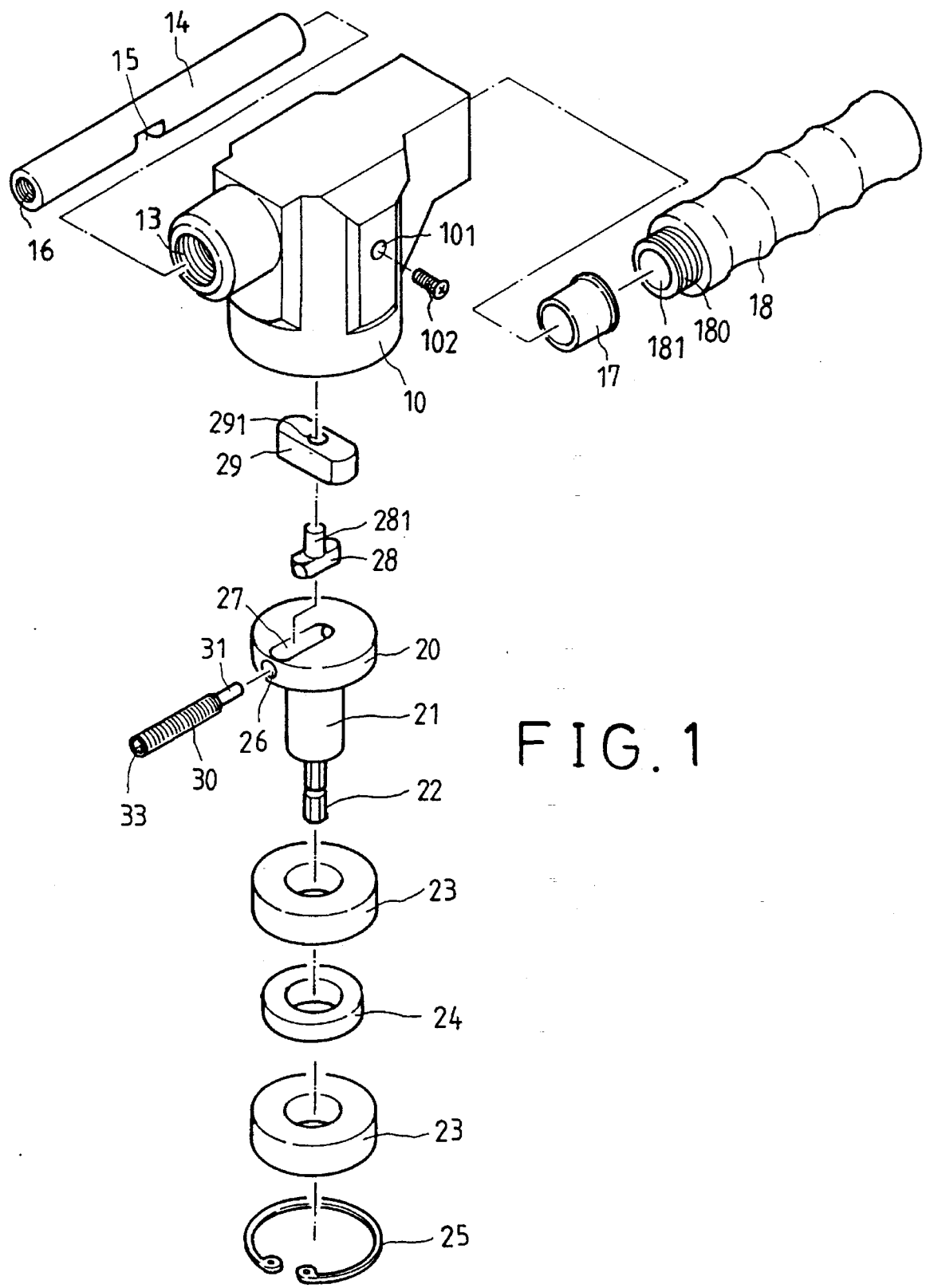
FIG. 1 is an exploded perspective view of a reciprocating acting tool in accordance with the present invention.
Figure 2:
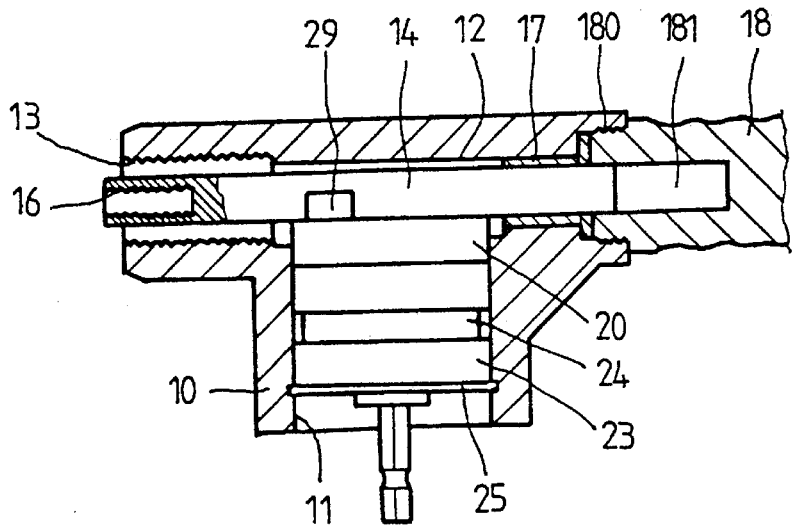
FIG. 2 is a cross sectional view of the reciprocating acting tool.
Figure 3:
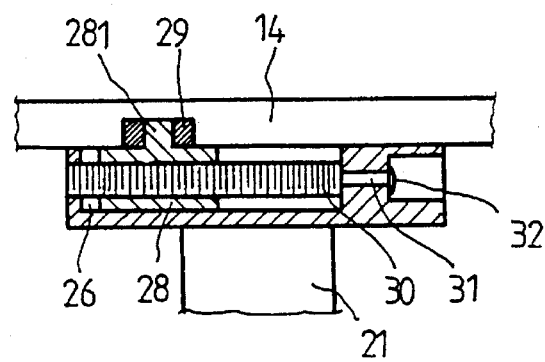
FIG. 3 is an enlarged cross sectional view taken along lines 3—3 of FIG. 6.

Referring to the drawings, and initially to FIGS. 1 to 3, a reciprocating acting tool in accordance with the present invention comprises a housing 10 including a chamber 11 formed therein and including a channel 12 laterally formed in the upper portion thereof and communicating with the chamber 11. The channel 12 includes an inner thread 13 formed in the front portion and in the rear portion respectively. A shaft 14 is slidably engaged in the channel 12 and includes a notch 15 formed therein and includes an inner thread 16 formed in the front portion thereof. A collar 17 is secured in the rear portion of the channel 12 and is engaged on the shaft 14 for smoothly supporting the shaft 14 in place. A handle 18 includes an outer thread 180 formed in the front portion for engaging with the inner thread 13 formed in the rear portion of the channel 12 so as to be secured to the housing 10. The handle 18 includes a bore 181 for slidably receiving the shaft 14. The housing 10 includes a passageway 101 laterally formed therein and communicating with the chamber 11. A screw 102 may be engaged with the passageway 101 so as to block the passageway 101.

A disc 20 is rotatably engaged in the chamber 11 and includes a rod 21 extended downward therefrom and includes an extension 22 extended downward from the rod 21. The extension 22 may be engaged with a motor or a pneumatic or hydraulic driving mechanism so as to be rotated by the same. Two bearings 23 and a spacer 24 are engaged on the rod 21 for rotatably supporting the rod 21 and the disc 20 in the housing 10. A retaining ring 25 is secured in the housing 10 for retaining the bearings 23 and the rod 21 and the disc 20 in place.

The disc 20 includes a groove 26 formed therein for rotatably receiving a bolt 30 therein. The bolt 30 includes a projection 31 extended therefrom and rotatably engaging in a hole of the disc 20. The projection 31 has a free end forged to form a head 32 such that the bolt 30 can be rotatably supported in the groove 26 and will not move longitudinally in the groove 26. The bolt 30 includes a free end having an engaging hole 33 formed therein for engaging with a wrench such that the bolt 33 may be rotated. The engaging hole 33 can be aligned with the passageway 101 of the housing 10 for engaging with the wrench so as to allow the bolt 33 to be rotated. The disc 20 includes a slot 27 formed in the upper portion and communicating with the groove 26. A slide 28 is slidably engaged in the groove 26 and is threadedly engaged with the bolt 30 such that the slide 28 may be caused to move longitudinally along the groove 26 when the bolt 30 is rotated. The slide 28 includes a stud 281 extended upward therefrom for engaging with a hole 291 of a follower 29 which is slidably engaged in the notch 15 of the shaft 14.

Figure 4:
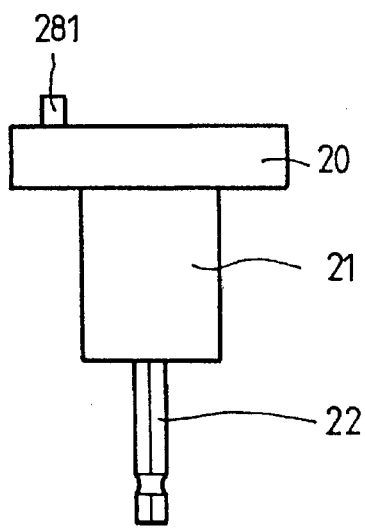
FIGS. 4 and 5 are plane views illustrating the operation of the stroke adjusting mechanism.
Figure 5:
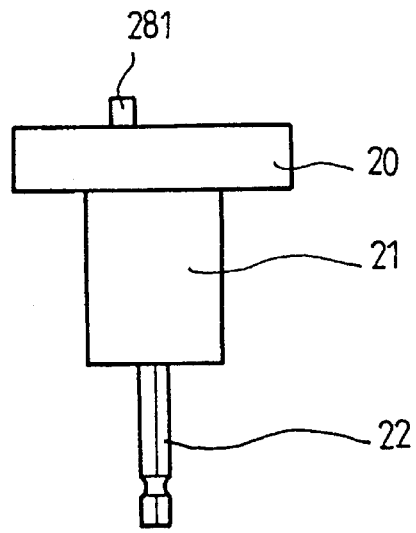
Figure 6:
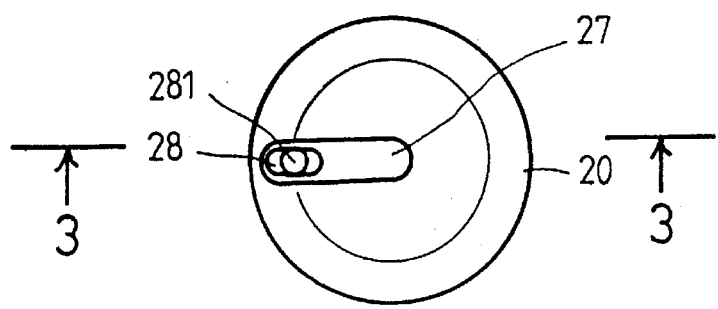
FIGS. 6 and 7 are top plane views of the tool as shown in FIGS. 4 and 5 respectively, illustrating the operation of the stroke adjusting mechanism.
Figure 7:
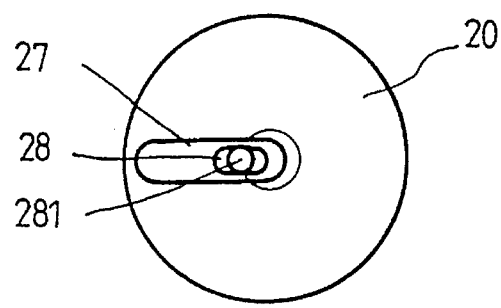

Referring next to FIGS. 4 to 7, and again to FIG. 3, the slide 28 may be moved longitudinally along the groove 26 so as to adjust the distance of the stud 281 relative to the center of the disc 20. As shown in FIGS. 4 and 6, the stud 281 is moved to the peripheral portion of the disc 20 such that the rotating radius of the stud 281 is increased. At this moment, the follower 29 and the shaft 14 may be moved in a reciprocating action with a larger moving stroke by the stud 281 such that the shaft 14 may be moved in a slower speed. On the contrary, as shown in FIGS. 5 and 7, the stud 281 is moved to the center portion of the disc 20 such that the rotating radius of the stud 281 is decreased. At this moment, the follower 29 and the shaft 14 may be moved in a reciprocating action with a smaller moving stroke by the stud 281 such that the shaft 14 may be moved in a faster speed.

Figure 9:
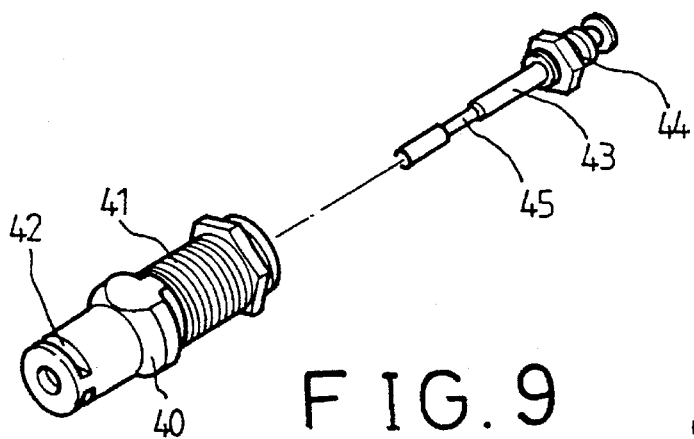
FIGS. 9 and 10 are partial exploded views illustrating two applications of the reciprocating acting tool respectively.
Figure 8:
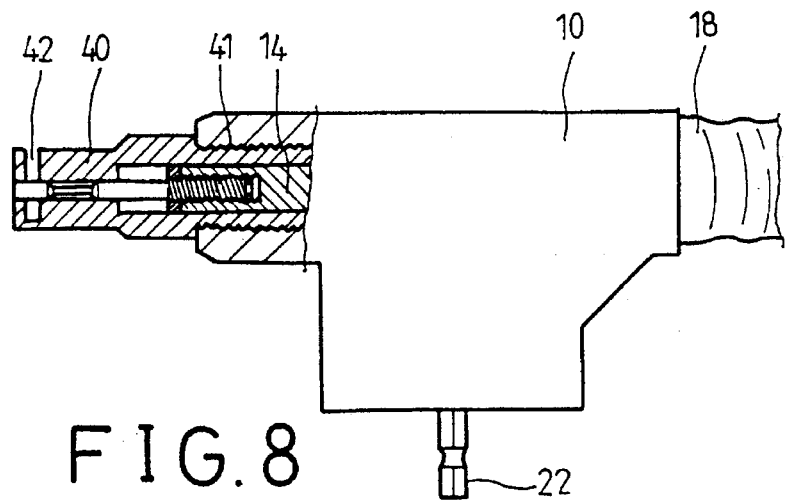
FIG. 8 is a partial cross sectional view illustrating an application of the reciprocating acting tool.

Referring next to FIGS. 8 and 9, illustrated is an application of the tool. A barrel 40 includes an outer thread 41 for threadedly engaging with the inner thread 13 of the housing 10 so as to be secured to the front portion of the housing 10. The barrel 40 includes a slit 42 formed therein for engaging with a plate to be cut. A pole 43 includes an outer thread 44 for engaging with the inner thread 16 of the shaft 14 so as to be moved by the shaft 14. The pole 43 includes an annular recess 45 for engaging with the plate to be cut and for cutting the edge portion of the plate when the plate is engaged in the annular recess 45. It is to be noted that the shaft 14 is required to be moved in a fast speed so as to smoothly cut the plate.

Figure 10:
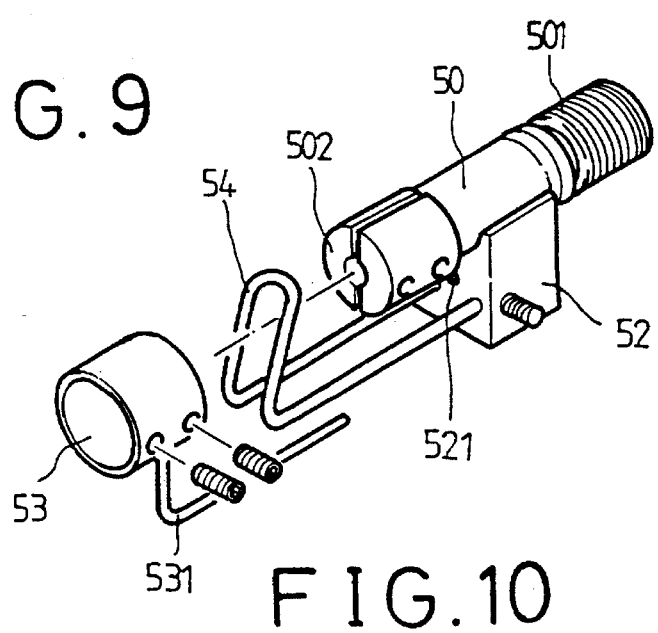
Figure 11:
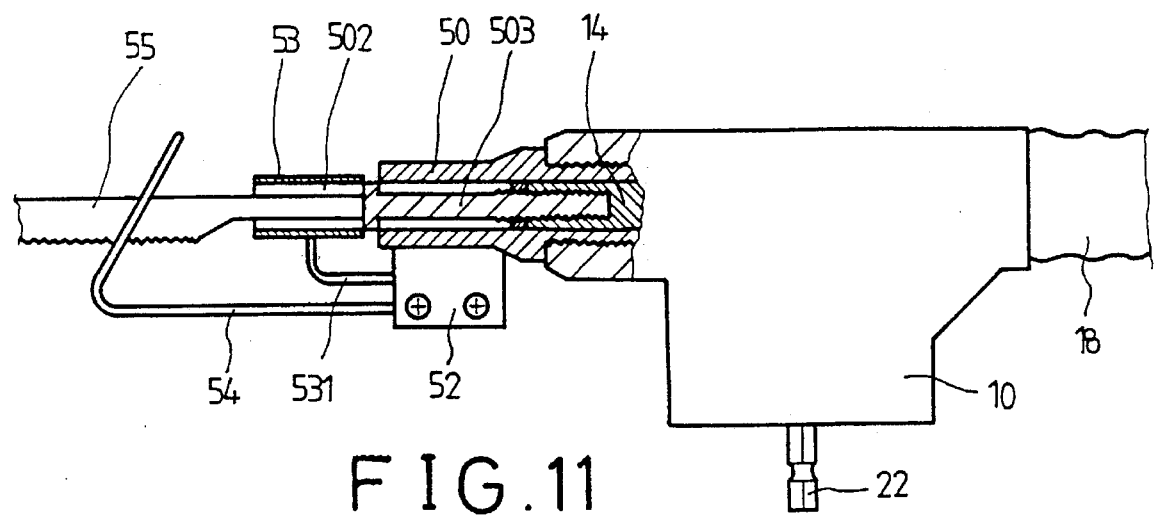
FIGS. 11 and 12 are partial cross sectional views illustrating two applications of the reciprocating acting tool.

Referring next to FIGS. 10 and 11, another barrel 50 includes an outer thread 501 for engaging with the inner thread 13 of the housing so as to be secured to the front portion of the housing 10. A block 502 includes a stick 503 having an outer thread for threadedly engaging with the inner thread 16 of the shaft 14 such that the block 502 may be moved in a reciprocating action by the shaft 14. A sleeve 53 is secured on the block 502 and includes a post 531 slidably engaged in a guide hole 521 of a support 52 which is secured to the barrel 50 such that the block 502 and the sleeve 53 may be guided to move relative to the barrel 50 longitudinally and may be prevented from rotating relative to the barrel 50. A saw blade 55 is secured to the block 502 so as to be moved in a reciprocating action by the block 502 and the shaft 14. A guard 54 is secured to the support 52 for protecting the saw blade 55. It is preferable that the shaft 14 moves in a larger stroke in this case such that the saw blade may be effectively operated.

Figure 12:
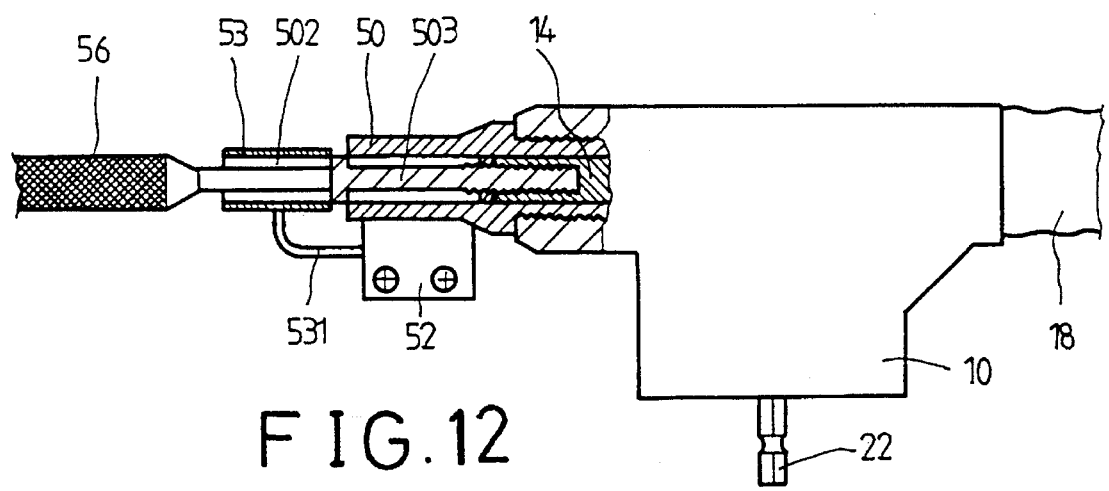

Alternatively, as shown in FIG. 12, a file 56 may be secured to the block 502 so as to be moved in a reciprocating action by the block 502 and the shaft 14. The acting speed of the file 56 is preferably in the middle speed between that of the saw blade and of the cutting tool.

Accordingly, the reciprocating acting tool in accordance with the present invention includes a slide that may be adjusted toward or away from the center of the disc in order to adjust the moving stroke and the moving speed of the acting shaft and the acting tools.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A reciprocating acting tool comprising:

a housing including a chamber formed therein and including an upper portion having a channel laterally formed therein and communicating with said chamber, said channel including a front end and a rear end, a shaft slidably engaged in said channel and including a notch formed therein and including a front end, a disc rotatably engaged in said chamber and including a groove formed therein and including an upper portion having a slot formed therein and communicating with said groove, a bolt rotatably received in said groove, a slide slidably engaged in said groove and threadedly engaged with said bolt so as to allow said slide to be moved longitudinally along said groove when said bolt is rotated, said slide including a stud extended upward therefrom, and a follower rotatably engaged with said stud and slidably engaged in said notch of said shaft, said slide being moved longitudinally along said groove so as to adjust a moving stroke and a moving speed of said shaft.

2. A reciprocating acting tool according to claim 1, wherein said housing includes a passageway laterally formed therein and communicating with said chamber, said bolt includes a projection extended therefrom and rotatably engaging in said disc, said projection has a free end having a head formed thereon for stably and rotatably supporting said bolt in said groove, said bolt includes a free end distal to said projection and having an engaging hole formed therein for aligning with said passageway of said housing and for engaging with a wrench so as to be rotated.

3. A reciprocating acting tool according to claim 1 further comprising a barrel including a first end secured to said front end of said housing and including a second end having a slit formed therein for engaging with a plate to be cut, a pole including a first end secured to said front end of said shaft so as to be moved in concert with said shaft and including a second end having an annular recess formed therein for engaging with said plate to be cut.

4. A reciprocating acting tool according to claim 1 further comprising a barrel including a first end secured to said front end of said housing, a block secured to said shaft so as to be moved in a reciprocating action by said shaft, a support secured to said barrel, a sleeve secured on said block and including a post slidably engaged in said support so as to guide said block and said sleeve to move relative to said barrel and so as to prevent said block from rotating relative to said barrel, and a saw blade secured to said block so as to be moved in a reciprocating action by said block and said shaft.

5. A reciprocating acting tool according to claim 1 further comprising a barrel including a first end secured to said front end of said housing, a block secured to said shaft so as to be moved in a reciprocating action by said shaft, a support secured to said barrel, a sleeve secured on said block and including a post slidably engaged in said support so as to guide said block and said sleeve to move relative to said barrel and so as to prevent said block from rotating relative to said barrel, and a file secured to said block so as to be moved in a reciprocating action by said block and said shaft.

* * * * *